United States Patent [19]

Schmitz et al.

[11] 4,445,809
[45] May 1, 1984

[54] APPARATUS FOR EMPTYING CONTAINERS FILLED WITH POWDER

[75] Inventors: Werner Schmitz, Hasselroth; Edgar Simon, Freigericht, both of Fed. Rep. of Germany

[73] Assignee: Degussa Aktiengesellschaft, Frankfurt am Main, Fed. Rep. of Germany

[21] Appl. No.: 488,552

[22] Filed: Apr. 25, 1983

Related U.S. Application Data

[63] Continuation of Ser. No. 225,821, Jan. 16, 1981, abandoned.

[30] Foreign Application Priority Data

Feb. 9, 1980 [DE] Fed. Rep. of Germany ....... 3004945

[51] Int. Cl.$^3$ ............................................. B65G 53/50
[52] U.S. Cl. .................................................. 406/152
[58] Field of Search ............... 406/137, 141, 151, 152, 406/153

[56] References Cited

U.S. PATENT DOCUMENTS

| | | | |
|---|---|---|---|
| 412,388 | 10/1889 | Hungerford | 406/141 |
| 1,242,840 | 10/1917 | Naramor | 406/152 |
| 2,301,617 | 11/1942 | Cox et al. | 406/152 |
| 3,097,017 | 7/1963 | Turner et al. | 406/137 |
| 4,029,364 | 6/1977 | Salzer | 406/141 X |
| 4,203,688 | 5/1980 | Shapunov et al. | 406/152 X |

FOREIGN PATENT DOCUMENTS 1096287 12/1960 Fed. Rep. of Germany ...... 406/141

*Primary Examiner*—Jeffrey V. Nase
*Attorney, Agent, or Firm*—Beveridge, DeGrandi & Kline

[57] ABSTRACT

Powders with a relatively low bulk density can be emptied from transportation containers only with a large and undesired production of dust. The apparatus for emptying powder-filled containers consists of a suction tube on which a fluidizing device is arranged in the neighborhood of the open end of the tube. This fluidizing device can have the form of a double-jacketed cone concentrically about the tube, or a hollow sphere concentrically about the tube. Fluidizing air can be introduced into the powder through bores arranged in the direction of the opening of the tube. To prevent the suction tube being sucked onto the container wall, the opening of the suction tube has a crenelated edge.

1 Claim, 3 Drawing Figures

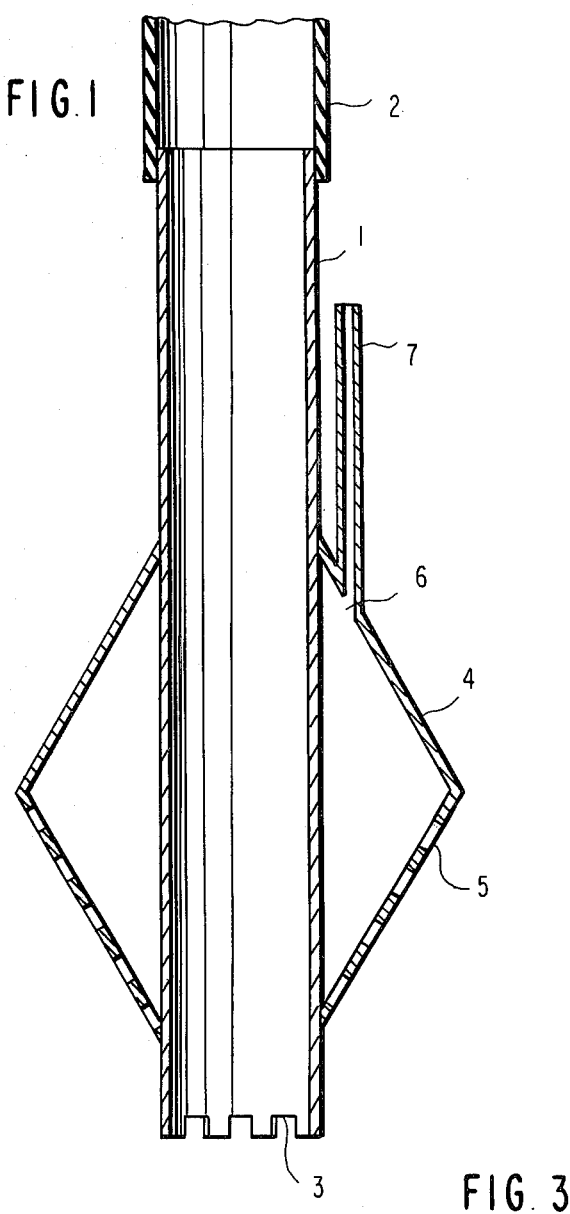
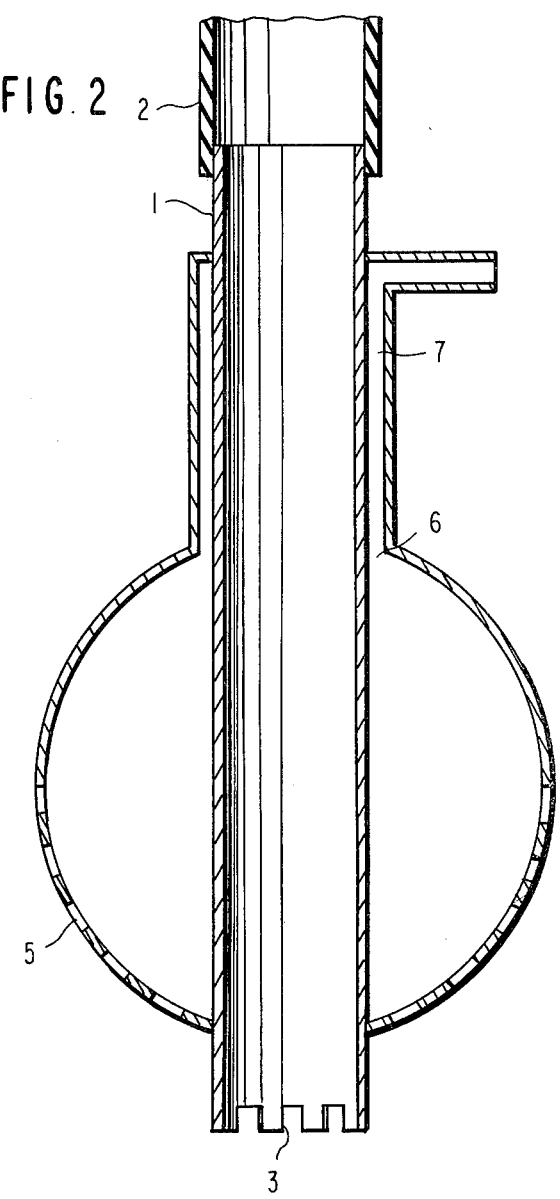
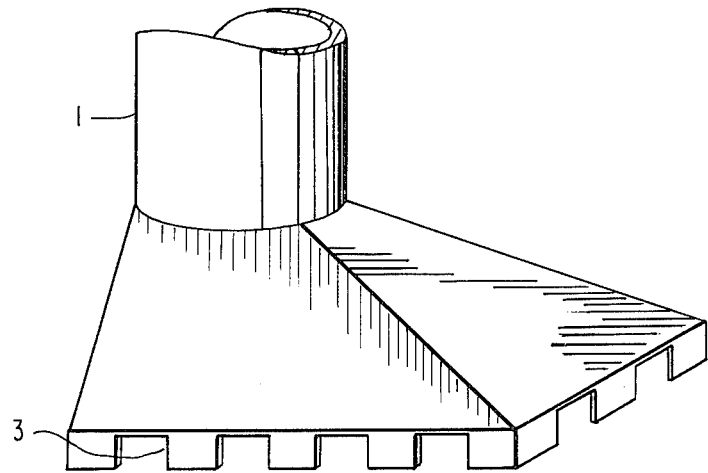

APPARATUS FOR EMPTYING CONTAINERS FILLED WITH POWDER

This application is a continuation of application Ser. No. 225,821, filed Jan. 16, 1981, now abandoned.

Powders with a very low bulk density, such as for example fumed (pyrogenic) silica, are transported as so-called bulk materials in box-like containers.

However, such containers have the disadvantage that they are unwieldy and the powder contained in them can only be emptied by complicated manipulations and with considerable dust production.

The object of the present application is an apparatus for emptying powder-filled containers, characterized in that it is formed of a tube which is provided at one end with a flexible tube and has an opening at the other end, a fluidizing device being arranged near the opening.

The fluidizing device can be arranged concentrically about the tube. In one embodiment, the fluidizing device can consist of a double conical jacket, the conical jacket directed towards the opening having bores, and the conical jacket directed towards the opening provided with a flexible tube, is provided with a gas infeed opening.

The gas infeed opening can be connected to a gas supply duct which is arranged parallel to the tube.

In one embodiment of the invention, the gas supply duct can be arranged coaxially about the tube.

In a particular embodiment, the apparatus according to the invention can have a crenelated edge at the opening.

It is particularly advantageous if this opening has a rectangular cross-section. In a special case of the rectangular cross-section, this can have a square shape.

During use, the apparatus according to the invention is connected by means of the flexible tube to a diaphragm pump which sucks the powder out of the container.

Simultaneously, compressed air, for example, can be fed via the gas supply duct into the powder in the neighborhood of the opening, either as a continuous stream or as pulses. The powder is then fluidized and can more easily be sucked out of the container.

The crenelated construction of the edge of the opening prevents the opening being sucked against the wall of the container.

The apparatus according to the invention will be explained and described in more detail with reference to the drawing, in which are shown:

FIG. 1—the apparatus according to the invention with a fluidizing device consisting of a coaxially arranged double jacket cone and a gas infeed duct arranged parallel to the tube, in cross-section.

FIG. 2—the apparatus according to the invention with a fluidizing device consisting of a hollow sphere arranged coaxial to the tube and a gas infeed duct arranged coaxially about the tube, in cross-section.

FIG. 3—an opening with a crenelated edge with a rectangular cross-section.

According to FIG. 1, the apparatus according to the invention is found of the tube 1 on which the flexible tube 2 is arranged. The fluidizing device 4, in the form of the double jacket cone, is arranged coaxially of the tube 1 in the neighborhood of the opening 3 having a crenelated edge, and has bores 5 as well as a gas infeed opening 6. The gas supply duct 7 is arranged on the gas infeed opening 6.

According to FIG. 2, the gas supply duct 7 is arranged coaxially about the tube 1. The fluidizing device consists of a hollow sphere arranged coaxially of the tube and has the bores 5.

According to FIG. 3, the opening 3 on the tube 1 is arranged with a crenelated edge, the cross-section of the opening having a rectangular shape.

Further variations and modifications of the foregoing invention will be apparent to those skilled in the art and are intended to be encompassed by the claims appended hereto.

We claim:

1. In an apparatus for emptying containers filled with powder, the improvement comprising providing a tube for emptying the powder in containers, which tube has an upper end and a lower end, the upper end having attached thereto a flexible tube, the lower end of the tube having an opening to permit entry of, and emptying of, the powder from the container, a fluidizing device arranged near the opening at the lower end of the tube and arranged concentrically around the tube thereby defining a jacket creating a chamber between the tube and the device, the jacket having bore holes associated therewith for introducing fluidizing air into the powder in the direction of said opening of the tube, said tube extending below the bore holes in the jacket, the opening being of rectangular cross section with a crenelated edge and of larger cross section than the tube, the said rectangular cross section of the opening decreasing in cross section in an upward direction toward the tube, said fluidizing device consisting of a double conical jacket provided with a gas supply duct parallel to the tube, or a hollow spherical jacket having a gas supply duct arranged coaxially about the tube.

* * * * *